United States Patent
Skarpness et al.

(10) Patent No.: US 6,662,233 B1
(45) Date of Patent: Dec. 9, 2003

(54) SYSTEM DYNAMICALLY TRANSLATES TRANSLATION INFORMATION CORRESPONDING TO A VERSION OF A CONTENT ELEMENT HAVING A BANDWIDTH CORRESPONDING TO BANDWIDTH CAPABILITY OF A RECIPIENT

(75) Inventors: Mark L. Skarpness, Hillsboro, OR (US); Ulhas Warrier, Beaverton, OR (US); Ryan R. Manepally, Hillsboro, OR (US); Jeffrey Einarson, Portland, OR (US); Holland Wood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/405,501

(22) Filed: Sep. 23, 1999

(51) Int. Cl.[7] .............................................. G06F 15/16
(52) U.S. Cl. ....................................... 709/246; 709/219
(58) Field of Search ................................. 709/217, 218, 709/219, 220, 232, 238, 239, 242, 233, 234, 246; 375/240.01; 345/753

(56) References Cited

U.S. PATENT DOCUMENTS

| 5,832,300 | A | * | 11/1998 | Lowthert ................ 375/240.01 |
| 5,983,263 | A | * | 11/1999 | Rothrock et al. ............ 345/753 |
| 6,038,598 | A | * | 3/2000 | Danneels ..................... 345/738 |
| 6,058,418 | A | * | 5/2000 | Kobata ........................ 709/220 |
| 6,144,996 | A | * | 11/2000 | Starnes et al. .............. 709/217 |
| 6,243,761 | B1 | * | 6/2001 | Mogul et al. ................ 709/217 |

* cited by examiner

*Primary Examiner*—Le Hien Luu
(74) *Attorney, Agent, or Firm*—Fish & Richardson P.C.

(57) ABSTRACT

To provide an effective way to deliver high-bandwidth content to some users and low-high bandwidth to other users, two or more different versions are stored of a content element to be delivered from a server to a content recipient in a network. In response to a request for the content from the recipient, one of the versions is selected based on bandwidth capabilities of the recipient. The selected version is then delivered to the recipient.

18 Claims, 3 Drawing Sheets

SYSTEM DYNAMICALLY TRANSLATES TRANSLATION INFORMATION CORRESPONDING TO A VERSION OF A CONTENT ELEMENT HAVING A BANDWIDTH CORRESPONDING TO BANDWIDTH CAPABILITY OF A RECIPIENT

BACKGROUND

This invention relates to content delivery on a network.

Web page content delivered from Internet service providers (ISPs) through the Internet to web browsers running on client devices is often optimized for a 28.8 kbps communication channel. The client devices are assumed to be generic PCs with 28.8 kbps modems. This relatively low-bandwidth delivery format reduces backbone traffic between the suppliers of the content and the ISPs, thus reducing costs for the ISPs.

Hand-held and other devices that have different capabilities and use different bandwidth channels than generic PCs are beginning to be used as web clients.

Delivery of content from a server to a client can be made faster and more effective by storing content in proxy caching clients. A proxy caching client is shared by multiple clients and services client requests from its cache whenever that is possible.

SUMMARY

To provide an effective way to deliver higher-bandwidth content to some users and lower-high bandwidth to other users, several different versions of a content element are stored for delivery from a server to a content recipient in a network. In response to a request for the content from the recipient, one of the versions is selected and delivered to the recipient based on bandwidth capabilities of the recipient.

The varied needs of different content providers and users are accommodated. Broadband content can be offered conveniently by content providers and received by broadband users, which enhances the user's experience. The delivery of broadband content is done deterministically. The content provider can update the content easily.

Other advantages and features will become apparent from the following description and from the claims.

DETAILED DESCRIPTION

Web page content is delivered (called "deterministic content delivery" or DCD) in a form that is determined by the nature of the client device that is to receive it and the quality of the communication channel used by the client device. By contrast, known systems deliver content in a fixed manner that is crafted only for a least-common-denominator client device communicating over a least-common-denominator communication channel.

As different client devices invoke the same web page Universal Resource Locator (URL), the content is returned in different forms to the different devices. Thus, for example, a client device that is capable of receiving and displaying or performing high bandwidth content from a given URL, such as a multi-media presentation, can receive and use that content while another client device that is only capable of receiving low bandwidth images could receive and display those images from the same URL.

Figure 1:
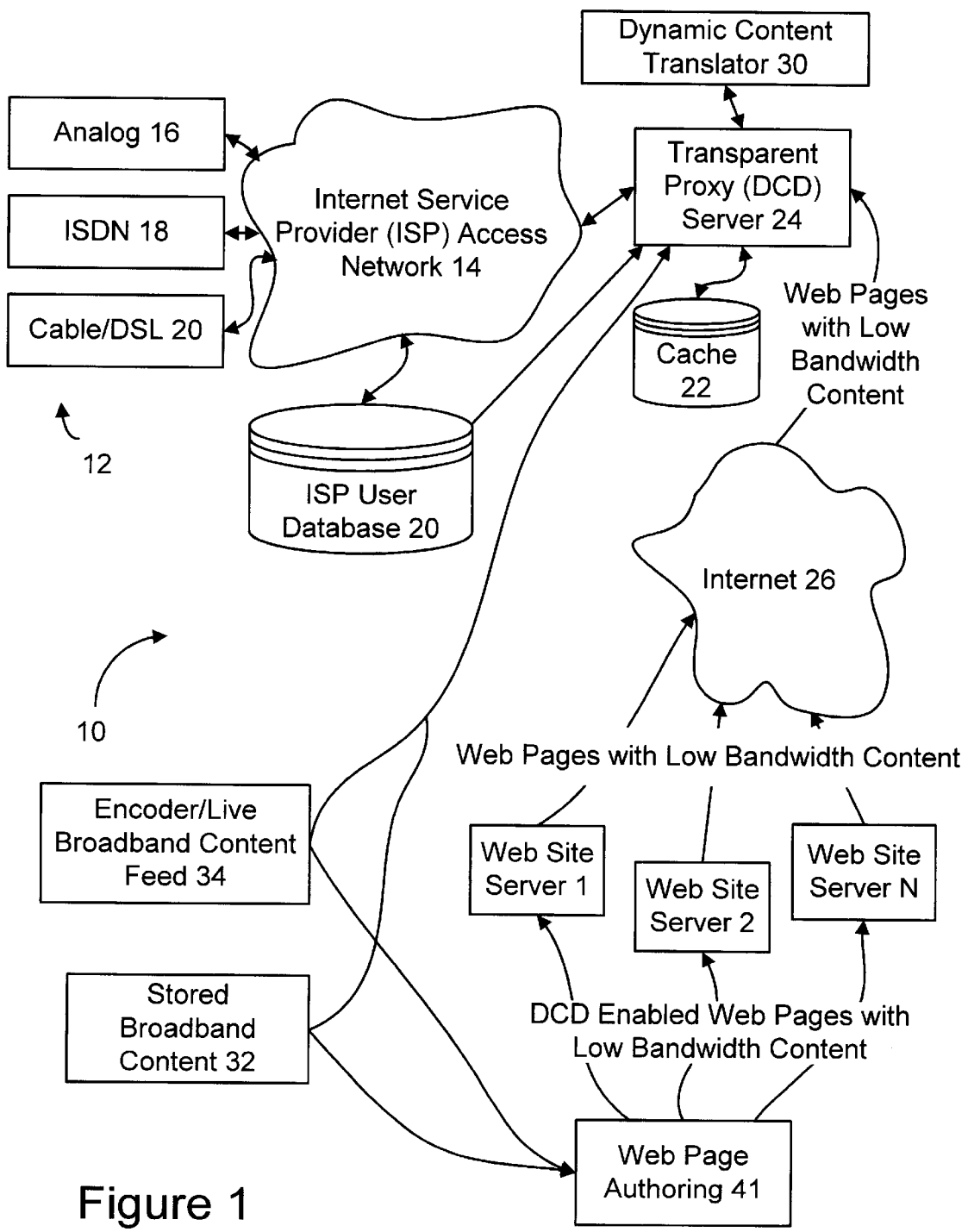
FIG. 1 is a block diagram of a deterministic content delivery system according to an embodiment of the invention.

As seen in FIG. 1, in a DCD system 10, client devices 12 are linked to an Internet Service Provider (ISP) access network 14 by a variety of different bandwidth communication channels that can include analog 16, integrated services digital network (ISDN) 18, or cable/digital subscriber line (DSL) 20. Web pages are delivered to the client devices in response to URL requests received from the client devices. The client devices 12 could be a variety of devices including a set-top box, an Internet appliance, a screen-phone, a hand-held device, a personal computer (PC) or any new type of device that may be developed to provide access to web sites.

At least some of the web pages that have URLs that may be the subject of client device requests are stored in a cache 22 and are retrieved by a transparent proxy server 24 (called a DCD server) for delivery via the network 14 to the client devices.

The cache 22 contains web pages that include low bandwidth content that has been received by the DCD server via the Internet 26 from centralized web site servers 1, 2, . . . , N in the typical way.

In at least some of the web pages that are delivered from the web site servers, some of the content has been specially coded to permit the DCD server to deliver the page to the client device with content in different possible forms. For example, the content could be delivered as text in one case, as an image in a second case, and as a video clip in a third case.

The choice of which form to use is made based on information about the client device and about the bandwidth of the channel by which it is connected to the ISP network. Based on the choice, the DCD server could, for example, either forward low bandwidth content received from the web site servers or corresponding high bandwidth content that has been pre-stored in cache 22. In the latter case, the DCD server can rely on a dynamic content translator 30 to change the content by selecting the higher bandwidth version instead of the lower bandwidth version.

The broadband content that is stored in the cache 22 comes from broadband sources that include stored broadband content 32 and encoded/live broadband content 34. The content is delivered to the DCD server, which stores it in the cache for later use.

The DCD enabled web pages that are delivered from the web site servers are created using a web page authoring application 41. The author has access to the broadband content and to corresponding narrow band content.

The following HTML snippet shows how a simple image file fish.jpg is normally included in a web page in the form of an HTML document.
<body>
<p><img border="0"
src="file:///p:/Documents/MyWeb/Fish.jpg" width="188" height="103">
</body>
Using the authoring system 41, a content author creating content for use in DCD would include additional information describing how the image should be translated for higher bandwidth client devices. The additional information is embedded within an HTML comment field to prevent it from being rendered by the browser at the client device.

The following HTML code illustrates the inclusion of the translation data. In this example, the content author is specifying in the comment field that for high bandwidth users, the image file fish.jpg should be replaced with the movie file fish_movie.avi and that the height and width of the movie should match those of the image file.

```
<body>
<!-- DCD_Translate_Image
   orig=fish.jpg new=fish_movie. avi preserve_size
-->
<p><img border="0"
src="/Documents/MyWeb/Fish.jpg" width="188"
height="103">
</body>
```

Figure 2:
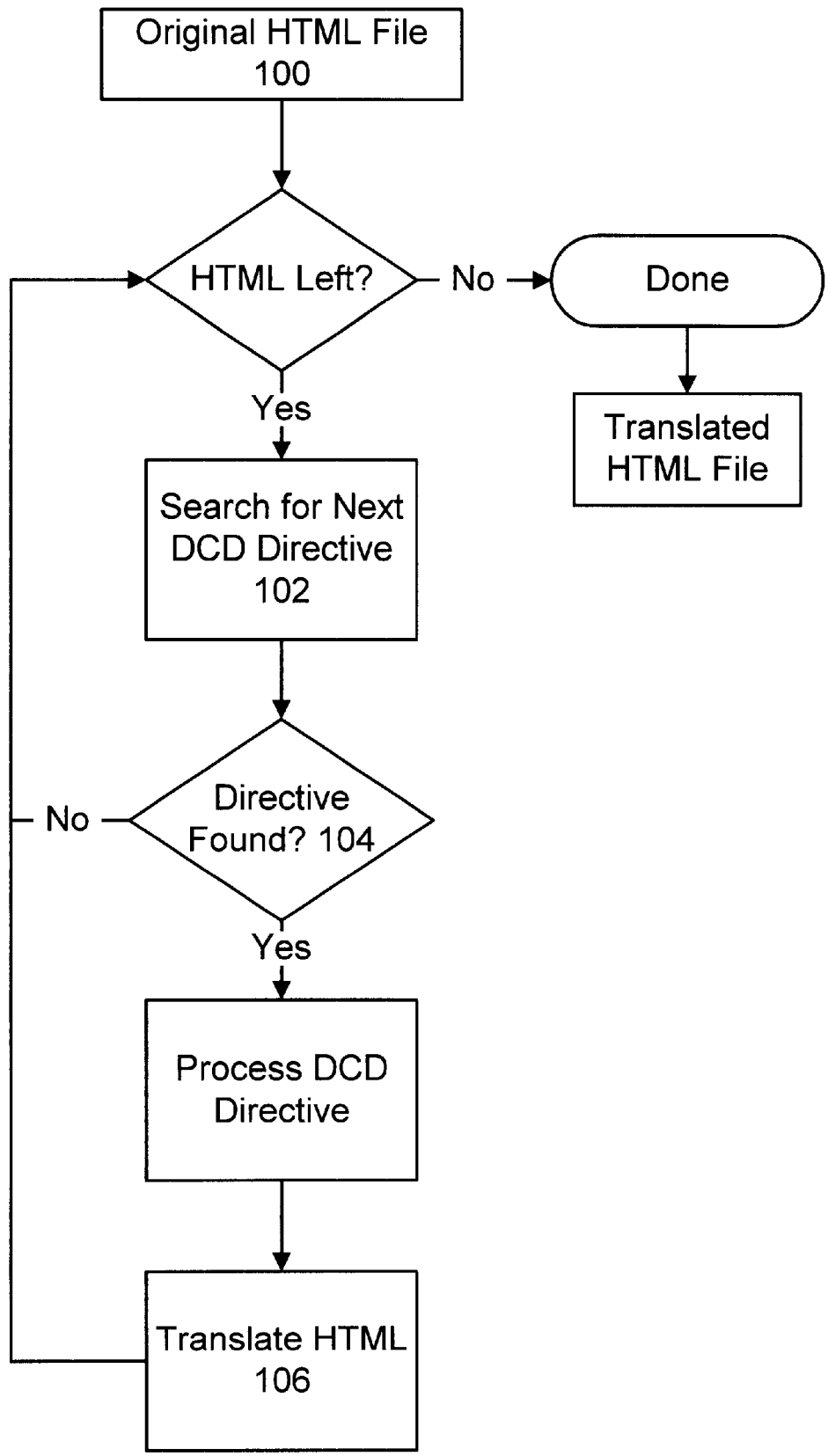
FIGS. 2 and 3 are related flow charts.

As seen in FIG. 2, as the original HTML page 100 passes through the dynamic translator 30 at the DCD server, the translator parses the HTML to find the DCD_Translate_Image directive 102. When the directive is found 104, the translator generates new HTML code 106 according to the directive. The following shows the HTML code after translation.
<body>
<p><img border="0"
src="/Documents/Myweb/fish_movie.avi" width="188"
height="103">
</body>

Each ISP maintains an ISP user database 20 that contains information about the bandwidth and other capabilities of the client devices of subscribers to the ISP and of the communication channel between the ISP and the client device. Based on the information in the database, the DCD server converts the content to a bandwidth and format that takes greatest advantage of each client device's capabilities.

As a result, a simple client device that has a slow connection and not much processing power may receive only text. A client device that has a fast connection may receive low quality streaming video. A powerful client with a fast connection may receive high quality streaming video and audio.

Although only one server is shown in FIG. 1, there can be many DCD servers. They form a distributed server system that has the advantages, compared with the central web site servers, of much better connections to the client devices, better latency, better quality of service (QOS), better connectivity.

To maintain the ISP user database the ISP measures the bandwidth of the channel connecting each client device to the ISP. The database could also include data, derived in other ways, that describes the characteristics of the client device.

In one method of operation, when a URL is received at the ISP from a client device, the ISP passes the URL to a Domain Name Service (DNS). The DNS may be configured to direct all requests to the DCD server. The DCD server may respond to those requests that refer to URLs for which it has stored content in the cache and to pass along all other URLs for response by other servers.

For requests received by the DCD server, the server fetches the requested content from the cache, translates it to higher bandwidth content if appropriate, and sends it to the ISP for forwarding to the client device.

The DCD server also returns to the originating web site server, information about what each client device has accessed on the DCD server.

Figure 3:
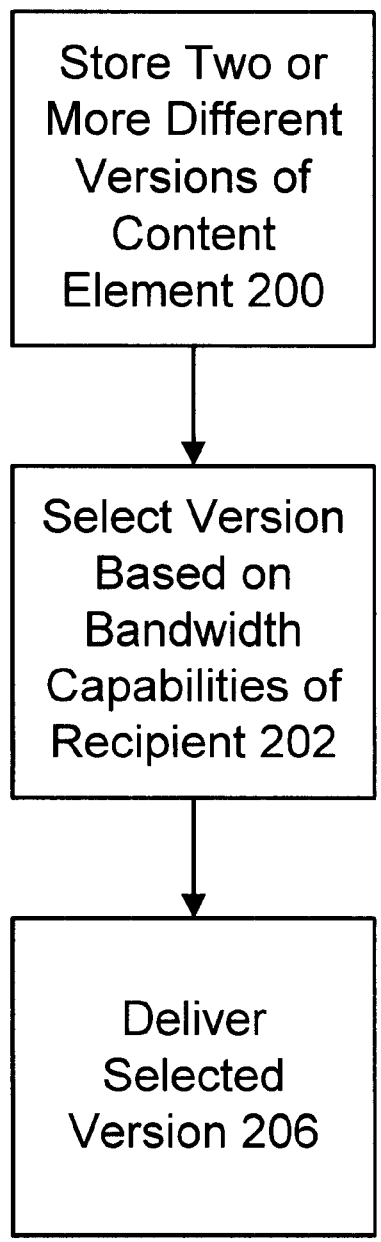

Thus, as shown in FIG. 3, in general, the DCD system stores 200 two or more different versions of a content element. In response to a request for the content from a recipient, the system selects 202 one of the versions based on the bandwidth capabilities of the recipient. Then the selected version is delivered at 206.

Other embodiments are within the scope of the following claims. For example, other modes of bandwidth-limited content distribution besides the Internet or the World Wide Web can be used.

What is claimed is:

1. A method comprising:
    storing translation information corresponding to a bandwidth capability of a recipient,
    in response to a request for content from the recipient, translating the translation information, the translated information corresponding to a version of a content element, the version of the content element having a bandwidth corresponding to the bandwidth capability of the recipient, and
    sending the version of the content element to the recipient.

2. The method of claim 1 in which the translation information comprises information embedded in a hypertext markup language (HTML) comment field.

3. The method of claim 1, further comprises:
    delivering one of the versions to a cache from a content generator using a communication path that is different from a path by which the other version of the content element is delivered to the cache.

4. The method of claim 1 in which the recipient comprises a client device running a web browser and the bandwidth capabilities comprise the processing power of the client device.

5. The method of claim 1 in which the recipient comprises a communication channel and the bandwidth capability comprise a bandwidth of the channel.

6. The method of claim 1 in which storing translation information comprises storing translation information corresponding to two different versions having two different quantities of data.

7. The method of claim 1 in which the version of the content element comprises an audio/visual work.

8. The method of claim 1 further comprising delivering the version from a transparent proxy server directly to an Internet service provider.

9. The method of claim 1 in which the content element is part of a web page and the web page is coded to indicate that the content element has two versions.

10. The method of claim 9 in which the web page is coded in HTML and an indication of the two or more versions is contained in a header.

11. The method of claim 1 further comprises:
    determining the bandwidth capability of the recipient and storing information about the results in a database.

12. The method of claim 1 in which the content recipient comprises a hand-held device.

13. An article comprising a storage medium having stored thereon instructions that when executed by a machine results in the following:
    storing translation information corresponding to a bandwidth capability of a recipient,
    in response to a request for content from the recipient, translating the translation information, the translated information corresponding to a version of a content element, the version of the content element having a bandwidth corresponding to the bandwidth capability of the recipient, and
    sending the version of the content element to the recipient.

14. The article of claim 13 in which the translation information comprises information embedded in a hypertext markup language (HTML) comment field.

15. The article of claim 13, further comprises:
delivering one of the versions to a cache from a content generator using a communication path that is different from a path by which the other version of the content element is delivered to the cache.

16. A transparent proxy server comprising:
storage for holding translation information corresponding to a bandwidth capability of a recipient, in response to a request for content from the recipient, one version of a content element corresponding to the translation information being delivered to the recipient based on a bandwidth capability of the recipient.

17. The server of claim 16 in which the translation information comprises information embedded in a hypertext markup language (HTML) comment field.

18. The article of claim 16 in which the storage comprises a cache.

* * * * *